UNITED STATES PATENT OFFICE.

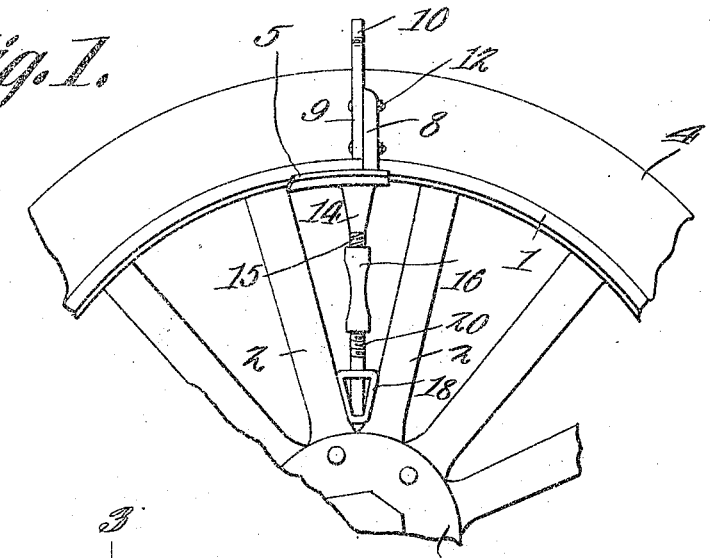
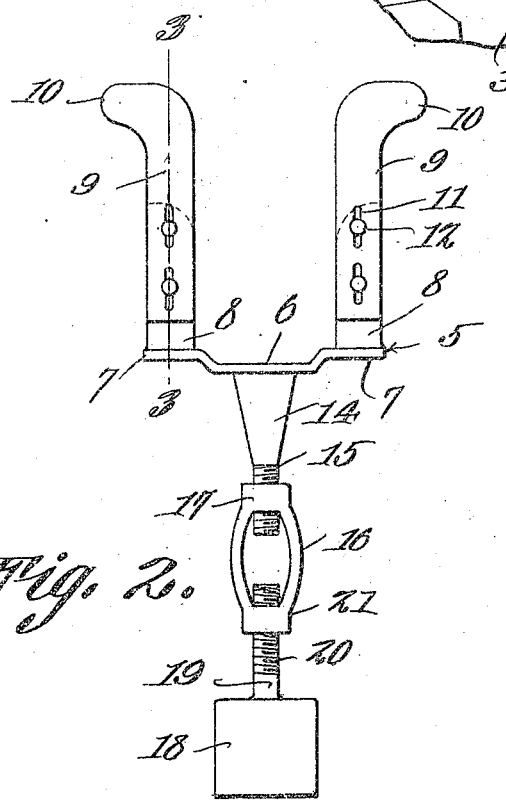
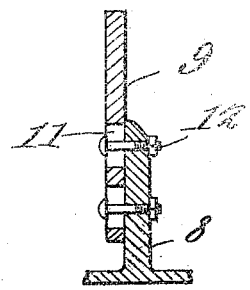

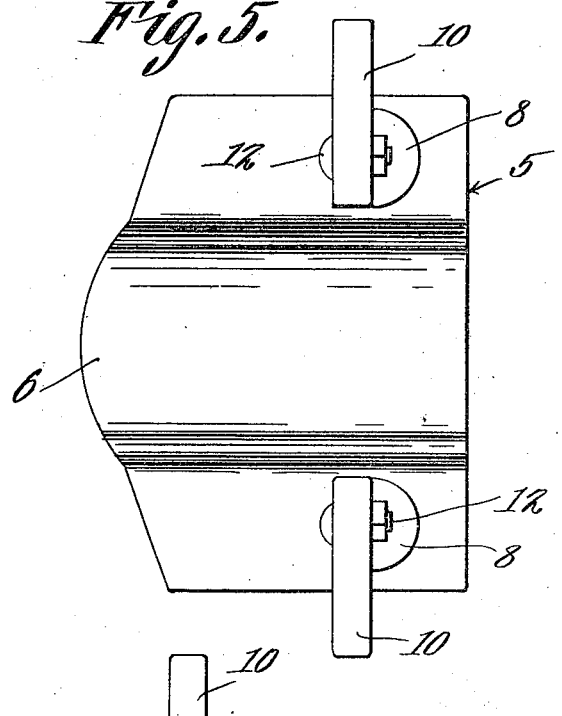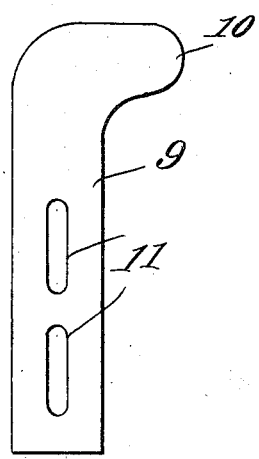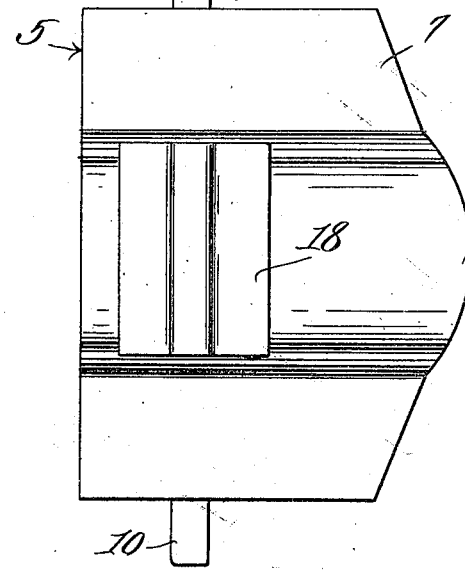

ELZA P. BERRY, OF SEDALIA, MISSOURI, ASSIGNOR OF ONE-HALF TO JAMES M. DE JARNETTE, OF SEDALIA, MISSOURI.

MUD-LUG FOR PROPELLING AUTOS.

1,217,904.                    Specification of Letters Patent.        Patented Mar. 6, 1917.

Application filed August 28, 1916. Serial No. 117,266.

*To all whom it may concern:*

Be it known that I, ELZA P. BERRY, a citizen of the United States, residing at Sedalia, in the county of Pettis and State of Missouri, have invented a new and useful Mud-Lug for Propelling Autos, of which the following is a specification.

The device forming the subject matter of this application is adapted to be applied to a vehicle wheel for the purpose of assisting in lifting the vehicle wheel out of the mud.

The invention aims to provide novel means for securing the body portion of the device rigidly but adjustably and removably to a wheel, and to improve the spuds and the means whereby the spuds are adjustably assembled with the body.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in side elevation, a portion of a vehicle wheel whereunto the device forming the subject matter of this application has been applied;

Fig. 2 shows the structure forming the subject matter of this application in elevation;

Fig. 3 is a section taken on the line 3—3 of Fig. 2;

Fig. 4 is an elevation showing one of the spuds.

Fig. 5 shows the complete device in top plan;

Fig. 6 shows the complete device in bottom plan; and

Fig. 7 is a fragmental view similar to Fig. 2, but showing the spuds reversed.

In the accompanying drawings, the numeral 1 designates a portion of the rim of a vehicle wheel connected by means of spokes 2 with a hub 3. The rim 1 is shown as carrying a tire 4.

In putting the present invention in practice there is provided a body 5 which extends transversely of the rim 1, and having a seat 6 in which the inner edge of the rim 1 is received, the body including side arms 7 which project laterally beyond the seat 6 and beyond the side faces of the rim 1. Mounted on the side arms 7 are standards 8. Spuds 9 are overlapped on the standards 8 and extend longitudinally thereof, the spuds 9 being provided with laterally projecting extensions 10 which extend in opposite directions away from the median plane of the wheel. If desired, the spuds 9 may be reversed on the standards 8, and then the extensions 10 will overhang the tread portion of the tire 4. The spuds 9 are equipped with longitudinal slots 11 receiving connecting devices 12, which may be bolts, the connecting devices being mounted in the standards 8. The spuds 9, in view of the construction last above described, are so mounted on the standards 8 that the spuds may be moved inwardly and outwardly, with respect to the center of the wheel, so that the outer ends of the spuds will project beyond the periphery of the tire 4 and enable the outer ends of the spuds to secure a hold on the ground. Further, this adjustment permits the device to be used in connection with tires of different diameters.

Secured to and projecting inwardly from the seat portion 6 of the body 5 is a stem 14 preferably of conical form, for strength, and threaded at its inner end as shown at 15. Onto the end 15 of the stem 14 is threaded one end 17 of a loop 16.

The numeral 18 designates a head which is preferably wedge-shaped, so that it will fit snugly between two adjacent spokes 2 as shown in Fig. 1. The head 18 may be of hollow construction as indicated in the drawings, but this detail is not insisted upon. The head 18 carries an outwardly projecting stem 19 threaded as shown at 20 to engage with the other end 21 of the loop 16. The stems 14 and 19 and the loop 16 constitute a turnbuckle connection between the body 5 and the head 18.

All parts of the structure, preferably, are made of metal.

In practical operation, the wedge-shaped head 18 is seated between the spokes 2 as shown in Fig. 1. The loop 16 then is rotated, and the body 5 is carried outwardly until the inner curve of the rim 1 is firmly engaged in the seat 6. The spuds 9 project beyond the periphery of the tire 4 and acquire a firm hold on the ground, whereby a stalled wheel may be lifted readily out of the mud. As hereinbefore pointed out, owing to the connection between the standards 8 and the spuds 9, including the slots 11 and the clamping devices 12, the spuds 9 may be adjusted inwardly and outwardly, in a radial direction, so that the spuds will have a firm hold on the ground.

It has been intimated hereinbefore that the spuds may be reversed so that their extensions 10 overhang the tire. The spuds are shown thus arranged in Fig. 7 of the drawings.

Having thus described the invention, what is claimed is:—

1. In a device of the class described, a rim-engaging body; a spoke-engaging head; a longitudinally extensible connection uniting the body and the head; standards carried by the body at the sides thereof; spuds mounted on the standards for adjustment longitudinally of the standards, toward and away from the head; and means for holding the spuds on the standards in adjusted positions.

2. In a device of the class described, a body provided intermediate its longitudinal edges with a rim-receiving seat, and provided along its longitudinal edges with laterally projecting side arms; standards projecting from the side arms; spuds mounted on the standards and extended longitudinally thereof; slot and clamping device connections between the spuds and the standards, whereby the spuds may be adjusted longitudinally of the standards; a wedge-shaped spoke-engaging head; a stem carried by the body; a stem carried by the head; and a nut threaded in opposite directions on to both stems.

In testimony that I claim the foregoing as my own, I have hereto affixed my signature in the presence of two witnesses.

ELZA P. BERRY.

Witnesses:
GEO. M. PEMBERTON,
FRANK MONROE.